US012662238B1

(12) United States Patent
Goin et al.

(10) Patent No.: US 12,662,238 B1
(45) Date of Patent: Jun. 23, 2026

(54) PUSH BUTTON RECONFIGURATION FOR RUDDER PEDAL

(71) Applicant: Textron Aviation Inc., Wichita, KS (US)

(72) Inventors: Levi Raymond Goin, Wichita, KS (US); Ronald Jay Parker, Wichita, KS (US); John Edward Reimer, Wichita, KS (US)

(73) Assignee: Textron Aviation Inc., Wichita, KS (US)

( * ) Notice: Subject to any disclaimer, the term of this patent is extended or adjusted under 35 U.S.C. 154(b) by 0 days.

(21) Appl. No.: 19/243,449

(22) Filed: Jun. 19, 2025

(51) Int. Cl.
B64C 13/06 (2006.01)
B64C 13/04 (2006.01)

(52) U.S. Cl.
CPC ............ B64C 13/06 (2013.01); B64C 13/044 (2018.01)

(58) Field of Classification Search
CPC .............................. B64C 13/044; B64C 13/06
See application file for complete search history.

(56) References Cited

U.S. PATENT DOCUMENTS

| | | | |
|---|---|---|---|
| 2010/0126298 A1* | 5/2010 | Spina | G05G 11/00 |
| | | | 74/490.15 |
| 2023/0278697 A1* | 9/2023 | Granier | B64C 13/50 |
| | | | 244/235 |
| 2024/0143014 A1* | 5/2024 | Picard | G05G 1/40 |

* cited by examiner

*Primary Examiner* — Ashesh Dangol
(74) *Attorney, Agent, or Firm* — Hovey Williams LLP

(57) ABSTRACT

An aircraft rudder control system having one or more rudder pedal adjustment systems, each including a rudder pedal actuatable to control movement of a rudder, and further including a support frame component, a rudder pedal arm, a pin, a pin receiving component, a first lever, a second lever, and/or a solenoid. The rudder pedal arm is rotatably attached to the support frame component and the rudder pedal is attached to the rudder arm. While the pin is received in the pin receiving component, the rudder pedal arm is prevented from rotating. When the pin is withdrawn from the pin receiving component, the rudder pedal arm is freed to be rotatably repositioned by user foot actuation. The first lever can manually actuate the pin into and out of the pin receiving component, and the second lever is operated by the solenoid, actuating the pin when the solenoid is activated and deactivated.

18 Claims, 8 Drawing Sheets

PUSH BUTTON RECONFIGURATION FOR RUDDER PEDAL

BACKGROUND OF THE INVENTION

Jets, turboprops, and piston aircrafts frequently have manually adjustable rudder pedals. These rudder pedals can be difficult for a pilot to adjust. For example, traditional mechanically-adjustable rudder pedals use a lever on an inward or outward side of the rudder pedal arm that requires a pilot to reach down and strain in a non-ergonomic position to adjust the rudder peddle positions via this lever. The motorized adjustable rudder pedals that do exist on current aircrafts generally use electric actuators to slide the whole rudder pedal assembly forward and aft, adding weight and complexity to the aircraft. Furthermore, some rudder pedals are fixed and cannot be adjusted for different pilots at all.

Thus there is a need in the art of aircraft pedal adjustment to overcome the deficiencies of the prior art.

SUMMARY OF THE INVENTION

Embodiments of the current invention address one or more of the above-mentioned problems and provide a distinct advance in the art of rudder pedal adjustment. For example, in one or more embodiments, an aircraft rudder control system includes a first rudder pedal adjustment system. The first rudder pedal adjustment system includes a rudder pedal actuatable to control a rudder of an aircraft, a support frame component, a rudder pedal arm rotatably attached to the support frame component, a pin actuatable toward and away from the rudder pedal arm, a pin receiving component attached to or integrally formed with the rudder pedal arm, and a solenoid for actuating the pin. Specifically, the rudder pedal is attached to the rudder arm, and the pin receiving component has two or more openings or receptacles for selectively receiving the pin, such that while the pin is in any of the two or more openings or receptacles, the rudder pedal arm is prevented from rotating. The solenoid is operable to withdraw the pin from the pin receiving component in response to activation of the solenoid, thereby freeing the rudder pedal arm to be rotatably repositioned by user foot actuation.

In another embodiment, an aircraft rudder control system has a first rudder pedal adjustment system having a rudder pedal, a support frame component, a rudder pedal arm, a pin, a pin receiving component, a first lever, a second lever, and a solenoid. The rudder pedal is actuatable to control movement of a rudder of an aircraft. The rudder pedal arm is spring-biased and rotatably attached to the support frame component. Furthermore, the rudder pedal is attached to the rudder arm. The pin receiving component is attached to or integrally formed with the support frame component and has two or more openings or receptacles to selectively receive the pin. While the pin is received in any of the two or more openings or receptacles, the rudder pedal arm is prevented from rotating. The first lever is pivotally attached to the rudder pedal arm and has a first end portion fixed to the pin and a second end portion spring-biased away from the rudder pedal arm. The first lever is pivotally attached to the rudder pedal arm between the first end portion and the second end portion. The second lever has a third end portion and a fourth end portion and is pivotally attached to the rudder pedal arm between the third end portion and the fourth end portion. The third end portion of the second lever is located between the first end portion and the rudder pedal arm. In response to activation thereof, the solenoid draws the fourth end portion of the second lever toward the solenoid, thus pivoting the second lever to raise the third end portion, which lifts the first end portion of the first lever. When the first end portion of the first lever lifts away from the rudder pedal arm, this motion withdraws the pin from the pin receiving component, thereby freeing the rudder pedal arm to be rotatably repositioned by user foot actuation.

In yet another embodiment, an aircraft rudder control system includes a first rudder pedal adjustment system and a second rudder pedal adjustment system. Each of the first rudder pedal adjustment system and the second rudder pedal adjustment system include a rudder pedal actuated to control movement of a rudder of an aircraft, as well as a support frame component, a rudder pedal arm, a pin, a pin receiving component, a first lever, a second lever, a solenoid, and a remote button or switch. The rudder pedal arm is spring-biased and rotatably attached to the rudder pedal arm and may comprise a solenoid support structure. Furthermore, the rudder pedal is attached to the rudder arm. A pin hole is formed through the rudder pedal arm, and a pin is actuatable into and at least partially through the pin hole of the rudder pedal arm and in another configuration is actuatable out of the pin hole of the rudder pedal arm. The pin receiving component is attached to or integrally formed with the support frame component. The pin receiving component has two or more openings or receptacles to selectively receive the pin, such that while the pin is received in any of the two or more openings or receptacles, the rudder pedal arm is prevented from rotating. The first lever is pivotally attached to the rudder pedal arm and has a first end portion fixed to the pin and a second end portion spring-biased away from the rudder pedal arm. The first lever is pivotally attached to the rudder pedal arm between the first end portion and the second end portion. The second lever has a third end portion and a fourth end portion and is pivotally attached to the solenoid support structure between the third end portion and the fourth end portion. The third end portion of the second lever is located between the first end portion and the rudder pedal arm. The remote button or switch is operable to selectively activate and deactivate the solenoid. The solenoid is attached to the solenoid support structure and is selectively operable via the remote button or switch to draw the fourth end portion of the second lever toward the solenoid in response to activation of the solenoid, thus pivoting the second lever to raise its third end portion which lifts the first end portion of the first lever, thereby withdrawing the pin from the pin receiving component and freeing the rudder pedal arm to be rotatably repositioned by user foot actuation.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF DRAWINGS

Embodiments of the current invention are described in detail below with reference to the attached drawing figures, wherein.

Figure 1:
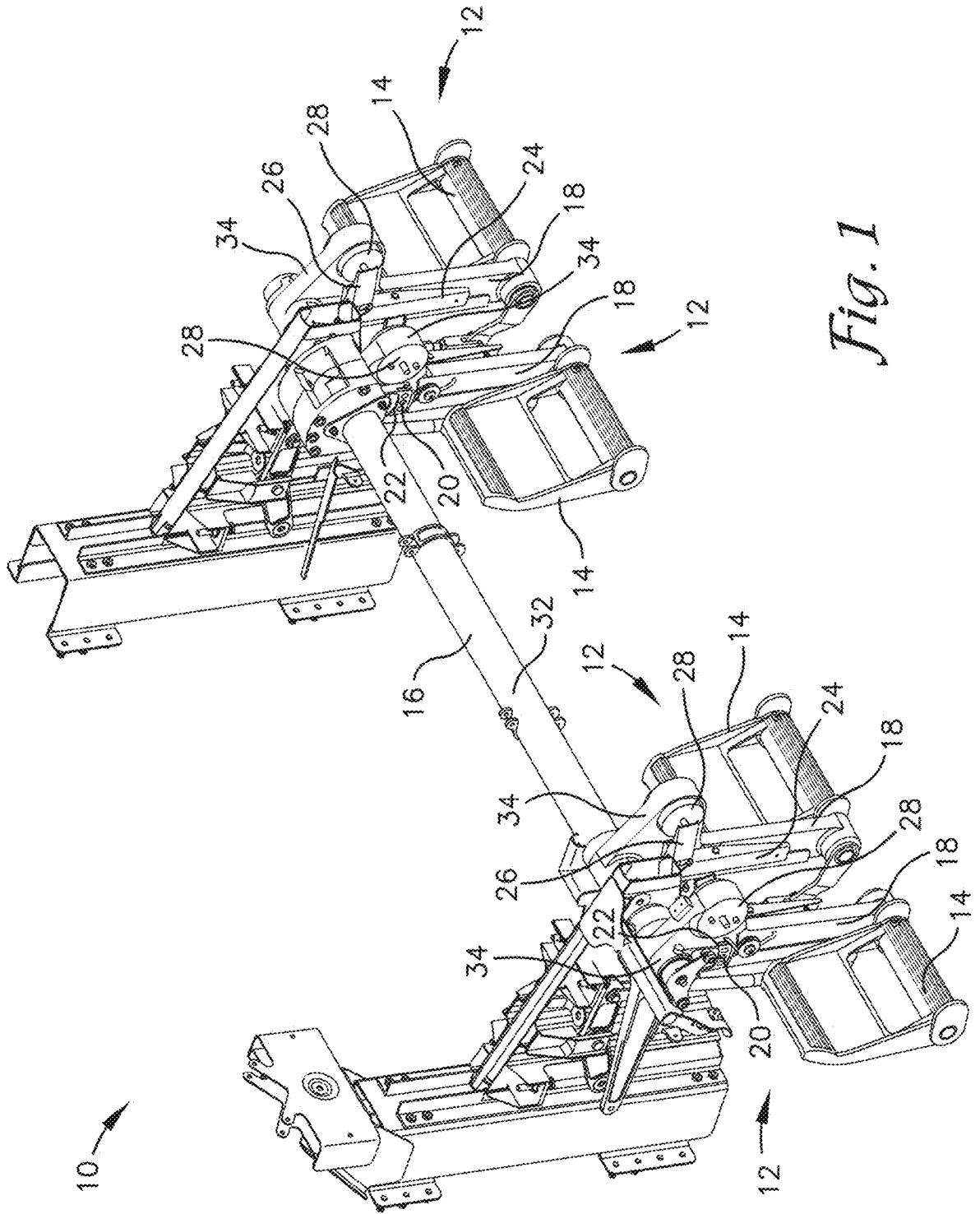
FIG. 1 is a perspective view of an aircraft rudder control system including four different rudder pedal adjustment systems that are each substantially identical and/or mirror images of the rudder pedal adjustment system of FIG. 1, in accordance with embodiments herein.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE INVENTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Embodiments herein provide a simple electric release to easily unlock adjustment pins to adjust a position of a rudder pedal in an aircraft. The aircraft may be any aircraft with manually adjustable rudder pedals (e.g. jets, turboprops, and piston aircrafts). In one or more embodiments, this electric release interfaces with existing mechanical release mechanisms, and is configured to additionally allow for mechanical back-up to adjust the rudder pedals if needed. A switch or button may be provided in an easy-to-reach location for the pilot (e.g., located on an aircraft's tilt panel) and may be electrically and/or communicably coupled with a solenoid configured to pull a lever that disengages an adjustment pin to release the rudder pedal from being locked in its present location. The pilot then can adjust a location of the rudder pedal with one or both feet (pressing the pedal further away from the pilot or allowing a rudder pedal arm to rotate further toward the pilot) and then, when the rudder pedal is in a desired position, the pilot can actuate the remote switch or button to reengage the pin into a pin receiving component via the solenoid, thereby locking the rudder pedal arm into its new position. Advantageously, this allows the pilot to merely hit a button or switch within arm's reach to adjust the rudder pedals, rather than straining to reach a rudder pedal adjustment lever down below, near the rudder pedal.

As depicted in FIGS. 1-8, an aircraft rudder control system 10 may comprise at least one rudder pedal adjustment system 12. For example, in some embodiments, the aircraft rudder control system 10 may comprise a first rudder pedal adjustment system and/or a second rudder pedal adjustment system that is a mirror image of the first rudder pedal adjustment system. Additionally or alternatively, embodiments, the aircraft rudder control system 10 may comprise other pluralities of the pedal position adjustment system 12, such as one for each rudder pedal (e.g., two for the pilot and two for the co-pilot to control, for four total).

In one or more embodiments, each of the rudder pedal adjustment systems 12 include a rudder pedal 14 actuated to control movement of a rudder (not shown) of an aircraft, as well as a frame 16, a rudder pedal arm 18, a pin 20, a pin receiving component 22, a first lever 24, a second lever 26, a solenoid 28, and a remote button or switch (not shown). Furthermore, in one or more embodiments the system 10 may further comprise a sensor 30 such as a microswitch, configured to indicate when the pin 20 is disengaged from the pin receiving component 22.

In one or more embodiments, the rudder pedal 14 (or any of the rudder pedals herein) is a foot-operated flight control that pilots use to control the rudder of the aircraft, which in turn affects the yaw (left-right movement) of the aircraft. By pushing the rudder pedals 14 (left rudder pedal and right rudder pedal), pilots can steer the aircraft during taxiing, take-off, landing, and in-flight maneuvers, especially when correcting for crosswinds. The rudder pedals 14 may be actuatable toward and away from the pilot or copilot via pressure from the pilot or copilot's foot. For example, the rudder pedal 14 may be pivotally or at least partially rotatably coupled to a part of the frame 16. The amount that the rudder pedal 14 pivots relative to the rudder pedal arm 18 is proportional to the angle change of the rudder (right or left) and/or a degree left or right that the aircraft is turned. In one or more embodiments, the rudder pedal 14 can be spring biased in a direction generally toward the pilot and a maximum position of the rudder pedal 14 (e.g., a position at which the rudder pedal 14 is closest to the pilot or co-pilot's seat) occurs when the pin 20 is removed from the pin receiving component 22 and the rudder pedal arm 18 springs into its natural state. The pilot or co-pilot can then press the rudder pedal 14, rotating the rudder pedal arm 18 until a desired rotatable position is reached, and can actuate or release the pin 20 into the pin receiving component 22 to lock the rudder pedal arm 18 into place.

The frame 16 described herein can be a support frame with a plurality of fixed and moveable components. The frame 16 can comprise a horizontal support 32 or another such support frame component, a solenoid support structure 34, and the rudder pedal arm 18. The rudder pedal 14 can be attached to the rudder pedal arm 18 in a fixed, actuatable, and/or rotatable manner. Specifically, the rudder pedal arm 18 may be fixedly attached and/or integral to the solenoid support structure 34 and may be pivotally or rotatably attached to the horizontal support 32. Specifically, in some embodiments, the rudder pedal arm 18 may have a portion jutting outward that is integral to the rudder pedal arm 18 and serves as the solenoid support structure 34. Furthermore, the rudder pedal arm 18 can be pivotally or rotatably attached to the rudder pedal 14 at a second location. As described above, in one or more embodiments, the rudder pedal arm 18 is rotatably attached to the frame 16 (e.g., the horizontal support 32) and can be spring-biased (e.g., toward the pilot or co-pilot) such that foot actuation of pushing the rudder pedal 14 attached thereto rotates the rudder pedal arm 18 into a desired position.

Figure 2:
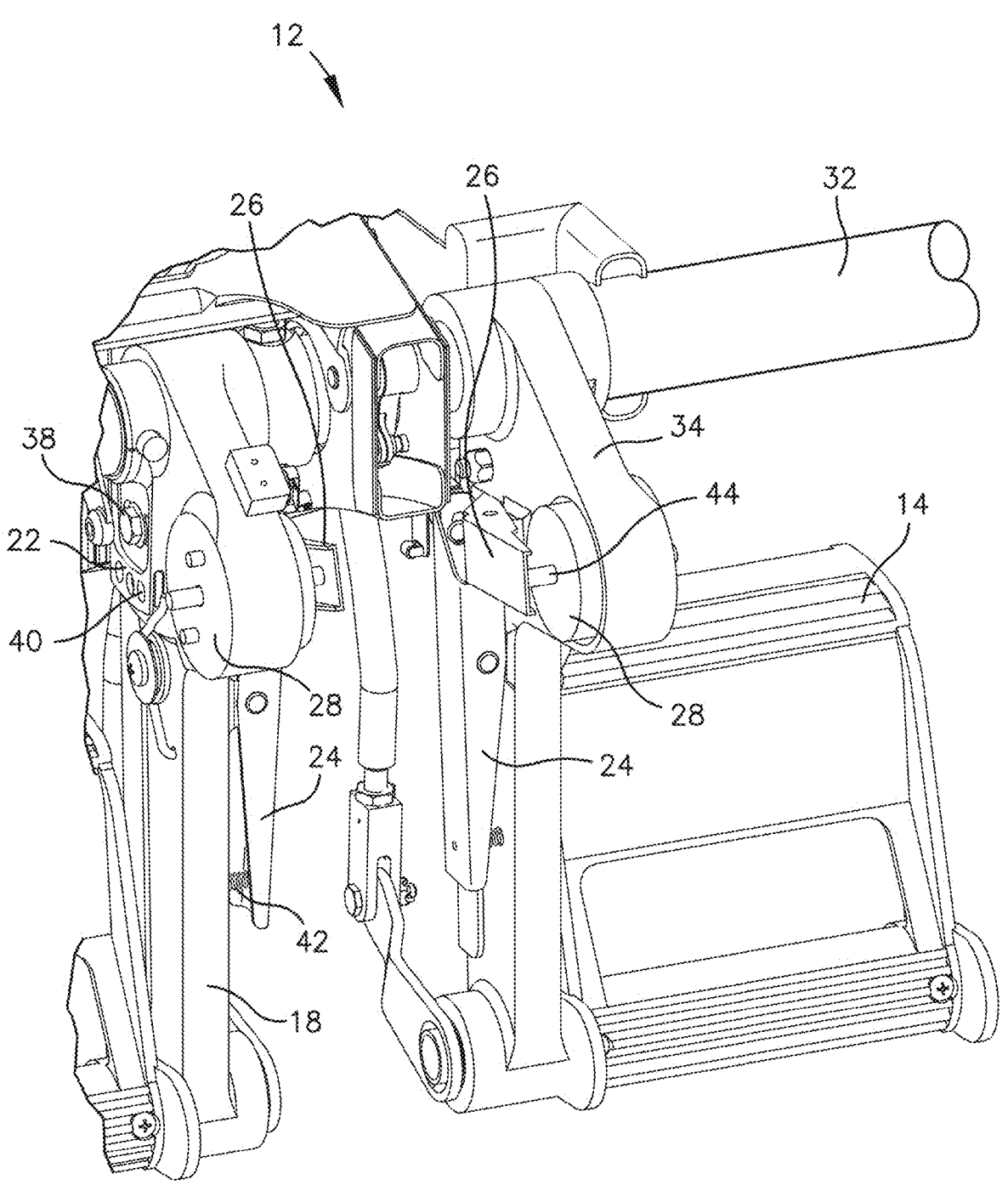
FIG. 2 is a side and front fragmentary perspective view of a rudder pedal adjustment system in accordance with embodiments herein.

In some embodiments, the single horizontal support 32 may support a plurality of solenoid support structures 34 and/or a plurality of rudder pedal arms 18, as depicted in FIGS. 1-2. Furthermore, the frame 16 may comprise any number of additional support structures that are fixedly and/or pivotally attached to the horizontal support 32 or any other portion of the frame 16 without departing from the scope of the technology as described herein. The solenoid support structure 34 may have a horizontal support opening through which the horizontal support 32 extends and/or may otherwise be rotatably attached to the horizontal support 32. Furthermore, the solenoid support structure 34 may have a solenoid opening through which at least a portion of the solenoid 28 extends and/or by which the solenoid 28 is supported. Additionally or alternatively, the solenoid 28 may be integrally formed with and/or otherwise attachable to the solenoid support structure 34.

Figure 6:
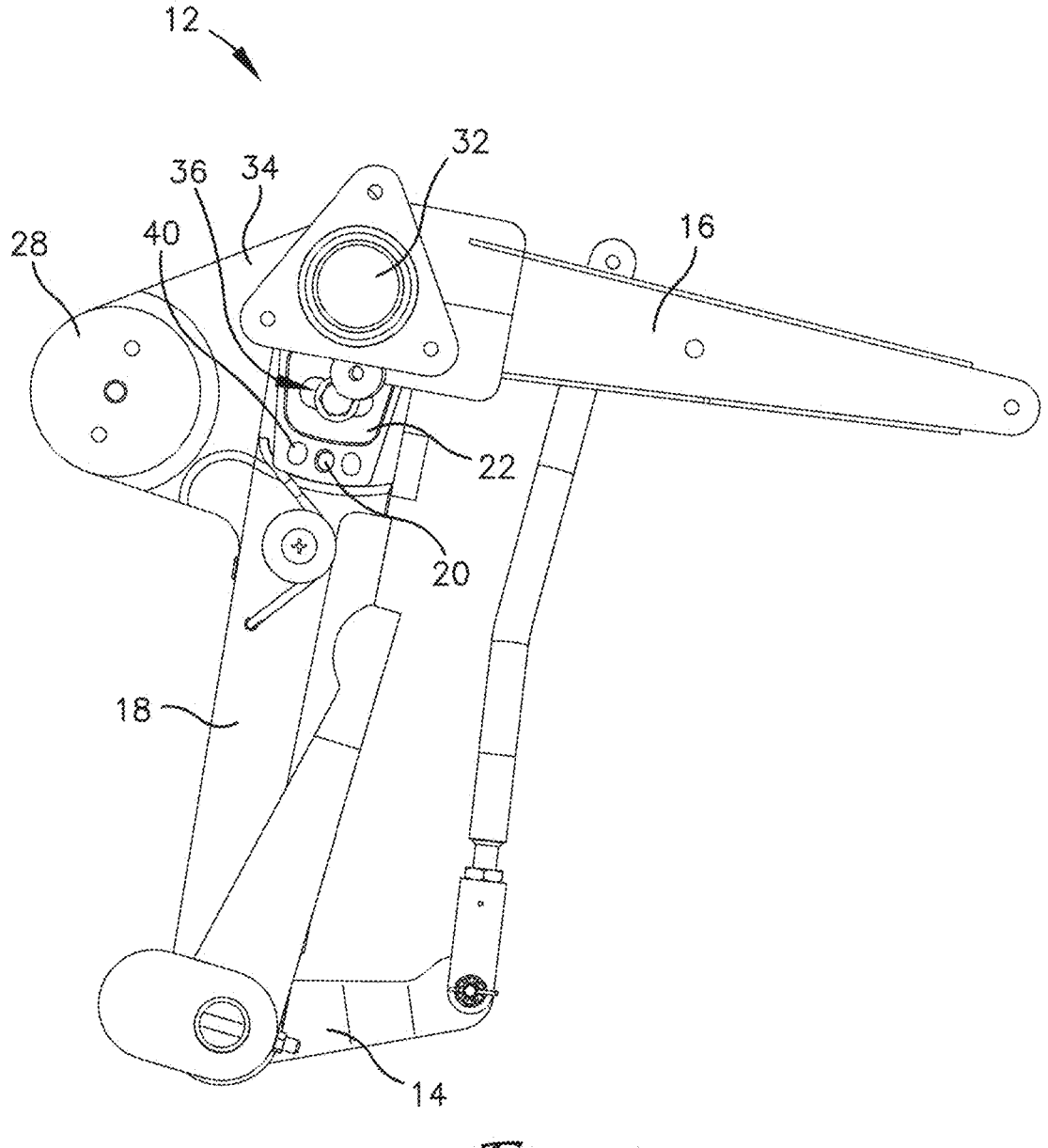
FIG. 6 is a right elevation view of the system of FIG. 1, in accordance with embodiments herein.
Figure 7:
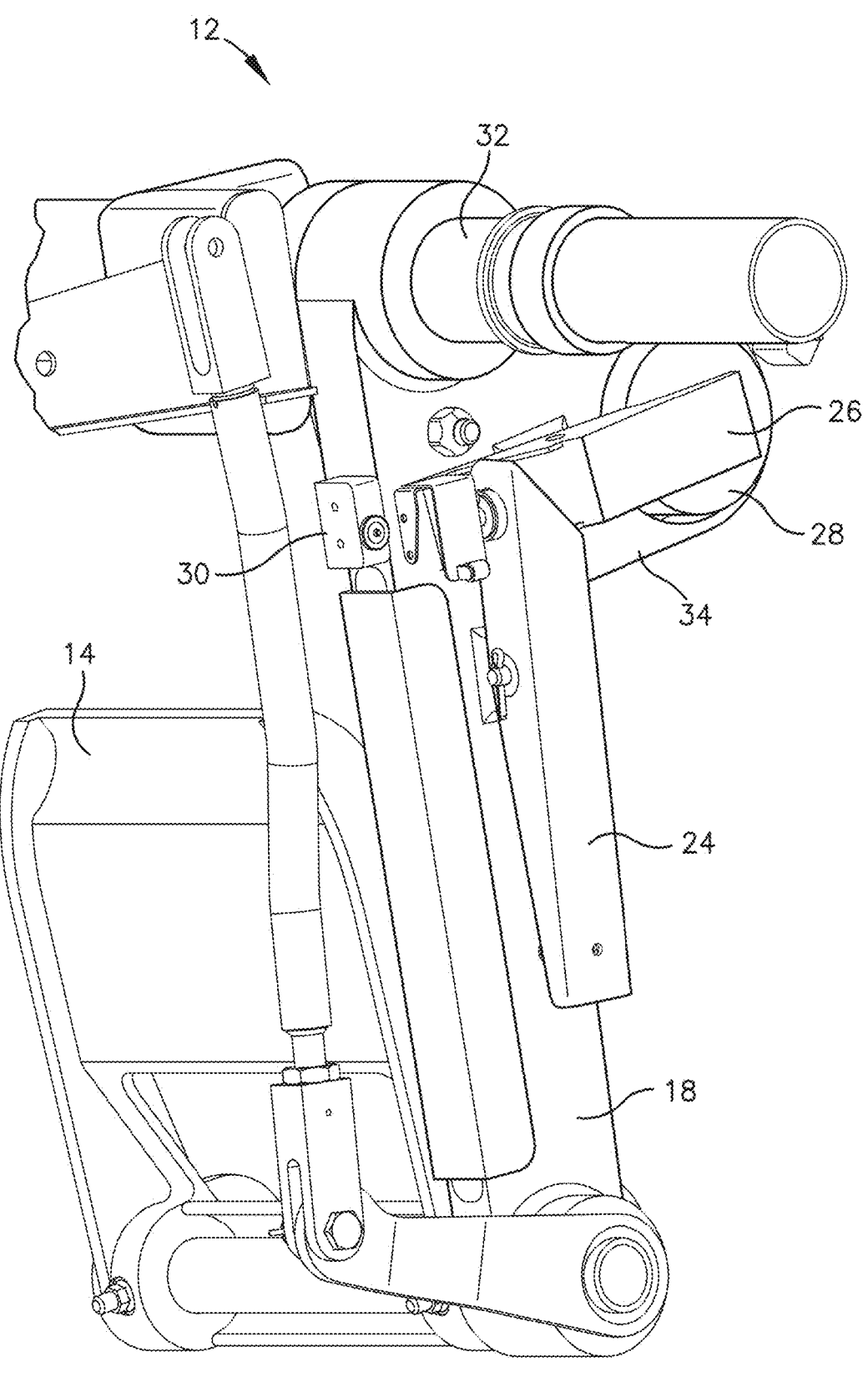
FIG. 7 is a back perspective view of the system of FIG. 1, in accordance with embodiments herein.
Figure 8:
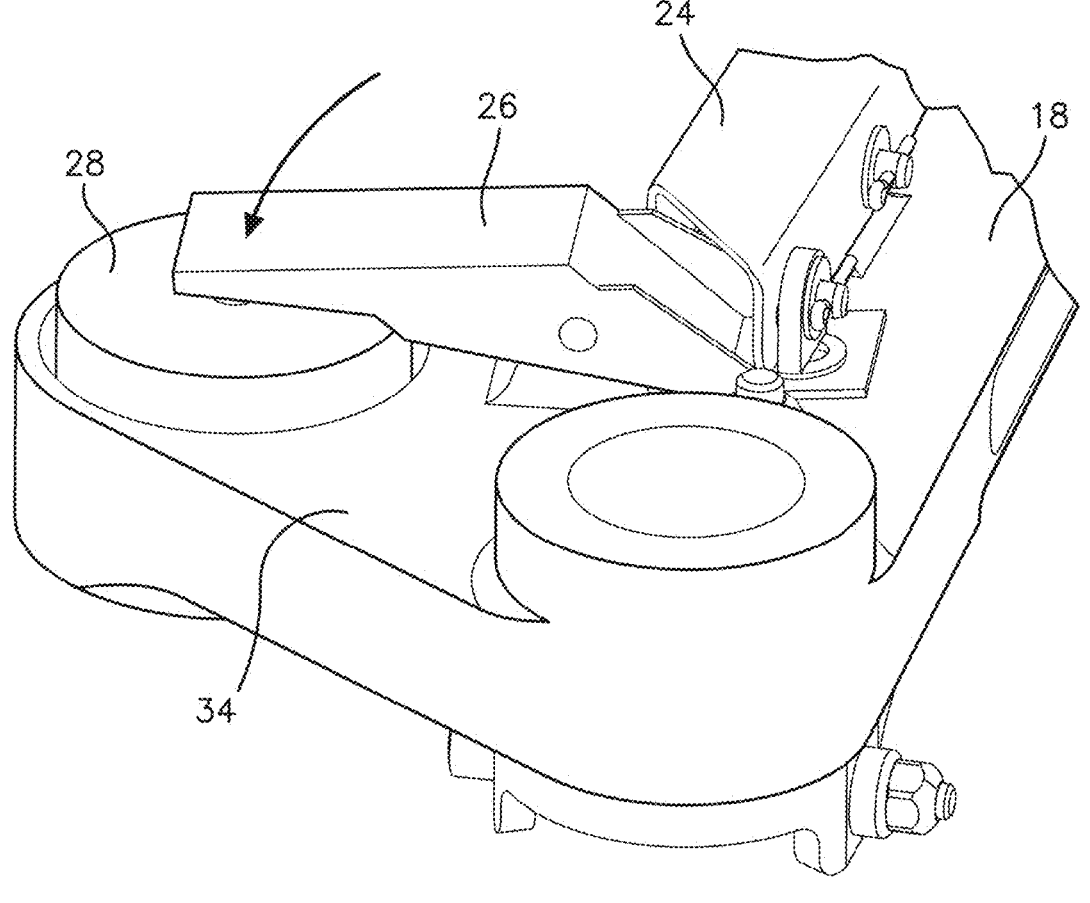
FIG. 8 is a fragmentary perspective view of the solenoid and the first and second levers of FIG. 2 when the solenoid is activated, in accordance with embodiments herein.

The pin 20 is actuatable toward and away from the rudder pedal arm 18 (e.g., through an opening in the rudder pedal arm 18) and the pin receiving component 22 is attached to or integrally formed with the frame 16 (e.g., the horizontal support 32). In some embodiments, as depicted in FIG. 6, an alignment opening 36 formed through the pin receiving component 22 may be formed in an arcuate slot configuration and have an alignment fastener 38 extending from the rudder pedal arm 18 through the alignment opening 36, such that when the rudder pedal arm 18 pivots relative to the pin receiving component 22, alignment between the rudder pedal arm 18 relative to the pin receiving component 22 is maintained. Furthermore, the pin receiving component 22 has two, three, or more openings or receptacles 40 to selectively receive the pin 20, such that while the pin 20 is received in any of the two, three, or more openings or receptacles 40, the rudder pedal arm 18 is prevented from rotating. When the pin 20 is withdrawn from one of the openings or receptacles 40, the rudder pedal arm 18 is free to rotate via spring-biased actuation into its natural maximum position and/or via manual force by the pilot, co-pilot, or other such operators (e.g., via pressing the rudder pedal 14 with an operator's foot).

Figure 3:
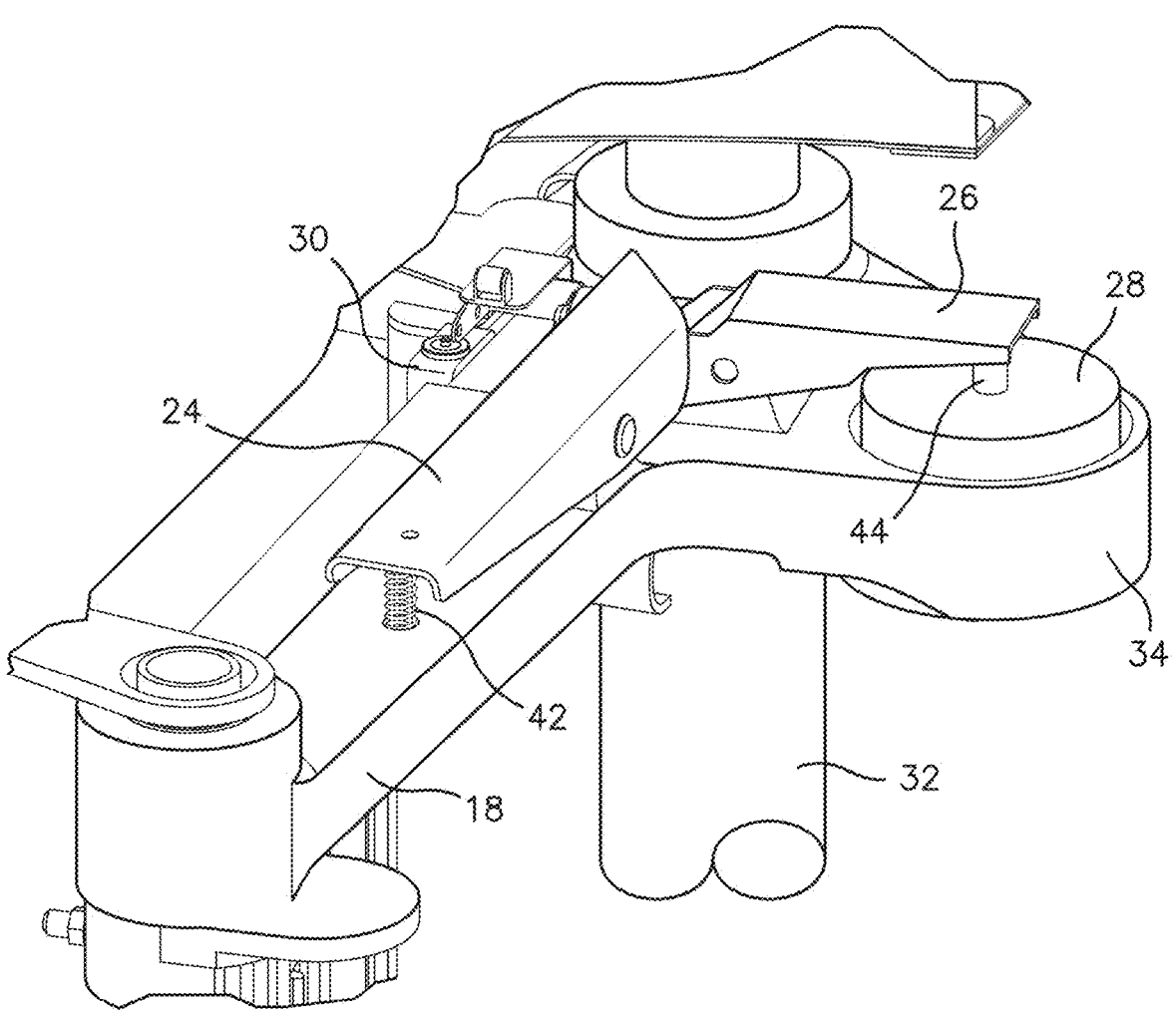
FIG. 3 is a fragmentary left side perspective view of a solenoid and first and second levers of the rudder pedal adjustment system of FIG. 1, in accordance with embodiments herein.
Figure 4:
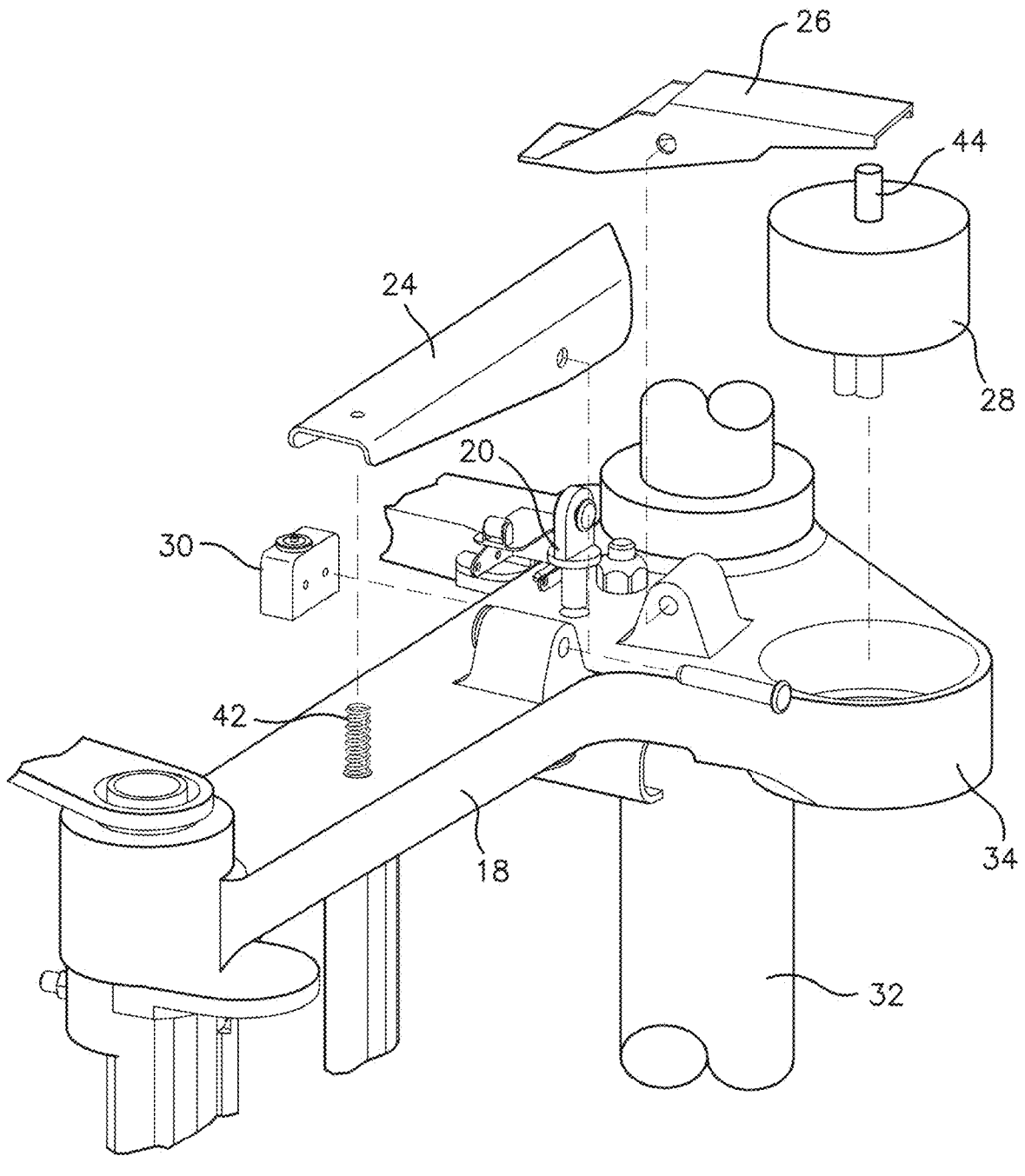
FIG. 4 is an exploded perspective view of the elements in FIG. 2, in accordance with embodiments herein.
Figure 5:
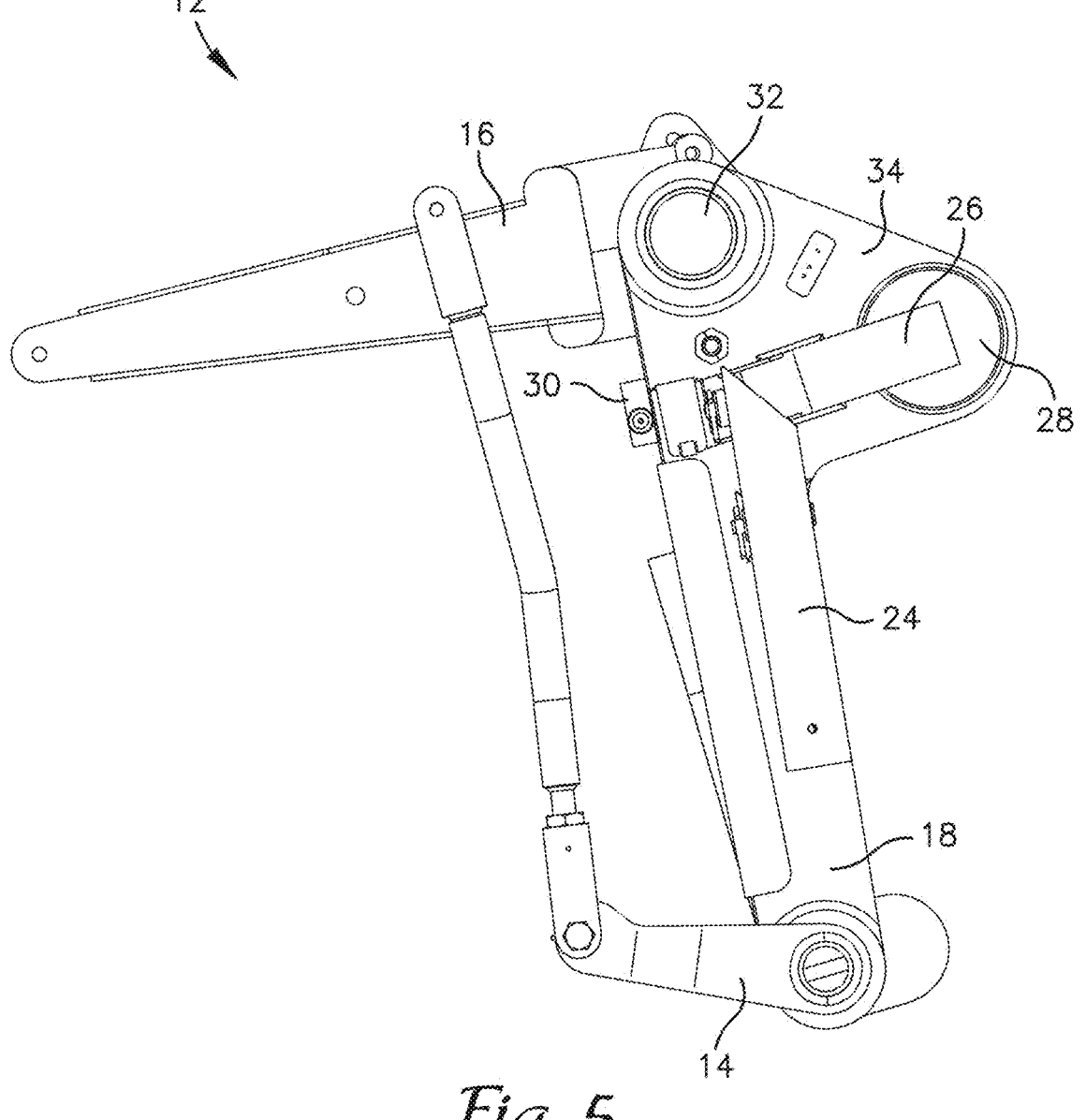
FIG. 5 is a left elevation view of the system of FIG. 1, in accordance with embodiments herein.

In one or more embodiments, the first lever 24 is pivotally attached to the rudder pedal arm 18 and has a first end portion fixed to the pin 20 and a second end portion spring-biased away from the rudder pedal arm 18. For example, as depicted in FIG. 3, a spring 42 is located between the second end portion and the rudder pedal arm 18 (e.g., with the spring 42 fixed to one or both of the second end portion and the rudder pedal arm 18). The spring 42 thus presses the first end portion of the first lever 24 to pivot in a direction toward the pin receiving component 22, such that the pin 20 is naturally biased to rest in one of the plurality of openings or receptacles 40 of the pin receiving component 22. In some embodiments, the pin 20 is integrally formed with the first lever 24 at the first end portion thereof. In other embodiments, the pin 20 is mechanically or otherwise fastened to the first lever 24 at the first end portion thereof. In one or more embodiments, the first lever 24 is pivotally attached to the rudder pedal arm 18 between the first end portion and the second end portion of the first lever 24.

In one or more embodiments, the second lever 26 has a third end portion and a fourth end portion and is pivotally attached to the solenoid support structure 34 between the third end portion and the fourth end portion. The third end portion of the second lever 26 can be located or sandwiched between the first end portion of the first lever 24 and the rudder pedal arm 18 (or the solenoid support structure 34).

In one or more example embodiments, the fourth end portion of the second lever 26 may be fixed to a plunger or armature of the solenoid, as later described herein. Furthermore, in one or more embodiments, a hole or cutout may be formed through or into the second lever 26 at the third end portion such that the pin 20 fixed to the first lever's first end portion can actuate through the hole or cutout and/or through an opening in the rudder support arm 18 to reach the pin receiving component 22. In some embodiments, when the second lever 26 and the solenoid 28 are added later to retrofit a manually-actuated first lever-only configuration, note that the pin 20 may need to be lengthened by at least an amount of thickness of the third end portion of the second lever 26 in order to properly reach the pin engagement component 22.

In one or more embodiments, the solenoid 28 includes a push-pull solenoid or other solenoids known in the art. For example, the solenoid 28 can be an actuator that can move in two opposing directions, pushing or pulling a load. Specifically, as later described herein, the load can be the second lever 26, and when the solenoid 28 is activated, the second lever 26 can pivot to disengage the pin 20 from the pin receiving component 22. In some embodiments, the solenoid 28 consists of a coil of wire, a movable plunger 44 (also known as an armature), and a housing, and may further include in some instances a spring for return upon deactivation. The coil, when energized, creates a magnetic field that attracts the plunger 44, which then moves to push or pull the attached load (e.g., an end of one of the first and/or second levers 24,26).

In one or more embodiments, the solenoid 28 may be part number 129415-026 as manufactured by LEDEX-Johnson Electric and distributed by Mouser Electronics, both headquartered in Mansfield, Texas. However, other solenoids may be used without departing from the scope of the technology described herein. In some example embodiments, approximately 15 lbs. (plus or minus 5 lbs.) is used to disengage the pin, via a solenoid having adequate stroke distance and force to accommodate these requirements. The second lever 26 and the size and configuration thereof may be designed to provide a mechanical advantage to disengage the pin with more movement and less force. For example, the second lever 26 may have a lever ratio of 5:3 so that the solenoid 28 can disengage the pin 20 by moving 0.3 inches and exerting approximately 8 lbs. on the second lever 26 to disengage the pin 20. In that example embodiment, the solenoid 28 is rated to produce 15 lbs. at 0.3 inch stroke. However, other suitable solenoids may be used without departing from the scope of the technology herein.

In one or more embodiments, the solenoid 28 is selectively operable via the remote button or switch to draw the fourth end portion of the second lever 26 toward the solenoid 28 in response to activation of the solenoid 28, thus pivoting the second lever 26 to raise the third end portion which lifts the first end portion of the first lever 24, thereby withdrawing the pin 20 from the pin receiving component 22 and freeing the rudder pedal arm 18 to be rotatably repositioned by user foot actuation. In one or more alternative embodiments, the solenoid 28 may be replaced with other remotely activated actuators known in the art. However, advantageously, solenoids are generally faster than most actuators. Furthermore, if the solenoid 28 loses power, the solenoid 28 will not hold its current position. So if the power went out as a pilot was adjusting the rudder pedals 14, the solenoid 28 would release its activated state and automatically engage the pin 20 again instead of making the rudder pedal arm 18 impossible to reengage with until power is restored. Conversely, most actuators will lock in their current position when power thereto is lost. However, there are some back-driveable actuators and/or actuators that have springs or fluid pressure or some device that will allow the actuator to return to a neutral position without power. Thus, those types of actuators could replace the solenoid 28 in one or more embodiments without departing from the scope of the technology described herein.

The remote button or switch is operable to selectively activate and deactivate the solenoid 28. In one or more embodiments, the button or switch may include a button that is held down to engage or activate the solenoid and then released to disengage or deactivate the solenoid. In embodiments with a plurality of rudder pedals, there may be separate individual remote buttons or switches for separate selective adjustment of positions for each of the rudder pedals. In some embodiments, instead of a button or switch, another remote activation such as a touch screen or the like may be used without departing from the scope of the technology herein.

In one or more embodiments, the sensor 30 or microswitch is configured for sensing engagement or disengagement of the pin 20 in the pin receiving component 22. For example, the sensor 30 or microswitch may be located on a back side of the rudder pedal arm 18 or other frame components, and there may be a component, on the first lever 24 configured to interact with the sensor 30 or microswitch. That is, the sensor 30 or microswitch may be configured to sense if the first lever 24 is pivoted to pull out and/or disengage the pin 20 from the pin receiving component 22. The sensor 30 or microswitch may also comprise a communication component and/or an electrical or communication wire configured to send a message to the pilot or co-pilot (e.g., an audio indication and/or a visual indication, such as a light or a screen indicator letting the pilot know that it is disengaged). In one or more embodiments, the sensor 30 or microswitch may be configured such that the audio or visual indication is only triggered if the pin 20 becomes disengaged or withdrawn when the button or switch is not pushed and/or when the second end portion of the first lever 24 is not depressed (e.g., an accidental disengagement which could negatively impact flight operation of the rudder pedal).

The systems 10 described herein may be powered via batteries and/or wired into electrical systems of the aircraft. For example, wiring may be routed down over the horizontal support 32 and/or the rudder pedal arm 18 and may be integrated into and/or otherwise electrically coupled to one or more of the electrical systems of the aircraft. Note that the pedal adjustment configurations described herein are described in reference to a rudder actuation system with rudder pedals. However, any adjustable pedals whose adjustment is controlled by a lever could utilize the system described herein without departing from the scope of the technology described herein.

In use, the solenoid 28 may, in response to activation via the remote button or switch, pivot the second lever 26 into a configuration which raises an end of the first lever 24 that is attached to the pin 20. This in turn disengages the adjustment pin 20 from the pin receiving component 22. Specifically, the solenoid 28 can be situated so that it pulls one end of the second lever 26 toward the solenoid 28 and/or the solenoid support structure 34, and an opposing end of the second lever 26 thus pulls an end portion of the first lever 24 attached to the pin 20 away from the rudder pedal arm 18 and the pin receiving component 22 to disengage the pin 20 from the pin receiving component 22. As described above, in some embodiments there are three positions for the pin 20 to spring into within the pin receiving component 22 when the solenoid 28 is again deactivated (e.g., the button is released). While the pin 20 is disengaged, the pilot can move the rudder pedal 14 (via rotation of the rudder pedal arm 18) to a desired position (e.g., the rudder pedal springs back toward the pilot and the pilot's foot presses the rudder pedal 14 and the rotating rudder pedal arm 18 into the desired position), and when the pin 20 engages, it springs into one of the three position holes or receptacles 40 of the pin receiving component 22. An end portion of the second lever 26 may be situated between the first lever 24 and the rudder pedal arm 18 so that the manual engagement using only the first lever 24 can still be used as a backup if the solenoid 28 stops working. In one or more example embodiments, the solenoid 28 is activated by a button on the tilt panel or on another in-cabin fixture, so the pilot has control over each foot adjustment of the rudder pedals 14 individually. This system 12 is mirrored on each of the rudder pedal arms 18 (e.g., the first rudder pedal adjustment system is identical and/or a mirror image set of the second rudder pedal adjustment system), for a total of two solenoids, two first levers, and two second levers for each set of the rudder pedals 14 (e.g., a total of four for a pilot and copilot).

So in a manual actuation situation, the first lever 24 is configured to be operated manually by user pressure to the second end portion of the first lever 24. Note that the first lever 24 is operable to perform this manual operation regardless of whether or not the solenoid 28 is activated, thereby manually pulling the pin 20 away from the pin receiving component 22 in response to the second end portion being manually pressed toward the rudder pedal arm 18, thereby pivoting first end portion away from the rudder pedal arm 18 and withdrawing the pin 20 from the pin receiving component 22.

Furthermore, in an automatic actuation situation, the user or pilot presses a button or flips a switch and the first end portion of the first lever 24 is lifted automatically, as described above, drawing the pin 20 out of the pin receiving component 22. In one or more embodiments, when the solenoid 28 is deactivated (e.g., when the user releases the remote button), the spring 42 applies return force on the second end portion of the first lever 24, pivoting the first end portion of the first lever 24 into its naturally-biased state, which thereby pushes the third end portion toward the rudder pedal arm 18 and the pin 20 into the two or more openings or receptacles 40 of the pin receiving component 22. As described above, in some embodiments, the second rudder pedal adjustment system is a duplicate set or mirror image set of each of the components of the first rudder pedal system described above. This allows the pilot to use the first rudder pedal adjustment system to control actuation of the rudder of the aircraft in a rightward direction and to use the second rudder pedal adjustment system to control actuation of the rudder of the aircraft in a leftward direction opposite of the rightward direction.

This invention allows the pilots to push a button on the tilt panel or flip a switch to disengage the pin 20 holding the rudder pedal arm 18 in place. The pilot then adjusts the rudder pedal 14 and/or the rudder pedal arm 18 to the desired position and lets go of the button, allowing the pin 20 to snap or spring back into the pin receiving component 22 at the desired position. For example, a push button or switch on the tilt panel may activate the solenoid 28 on the solenoid support structure 34, which pulls on the second lever 26 which pivots to lift an end of the first lever 24 and disengages the adjustment pin 20. In some alternative embodiments, the solenoid 28 may directly engage with the pin 20 without the levers described herein for inserting and withdrawing the pin 20 from the pin receiving component 22. In other alternative embodiments, the first lever 24 may be omitted and the second lever 26 is directly attached to the pin 20 and actuates the pin 20 via the solenoid 28.

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

The invention claimed is:

1. An aircraft rudder control system comprising:
a first rudder pedal adjustment system including:
   a rudder pedal actuatable to control a rudder of an aircraft;
   a support frame component;
   a rudder pedal arm rotatably attached to the support frame component, wherein the rudder pedal is attached to the rudder arm;
   a pin associated with the rudder pedal arm;
   a pin receiving component attached to or integrally formed with the support frame component and having two or more openings or receptacles configured to selectively receive the pin, such that while the pin is in any of the two or more openings or receptacles, the rudder pedal arm is prevented from rotating; and
   a solenoid configured to withdraw the pin from the pin receiving component in response to activation of the solenoid, thereby freeing the rudder pedal arm to be rotatably repositioned by user foot actuation,
   a first lever having a first end portion and a second end portion, wherein the first lever is pivotally attached to the rudder pedal arm between the first end portion and the second end portion, wherein the first lever is fixedly attached to the pin at the first end portion, wherein the first lever is spring-biased to press the pin toward the pin receiving component when the first lever is in a first configuration and is configured to pull the pin away from the pin receiving component in response to the first lever pivoting to a second configuration via the second end portion being pressed toward the rudder pedal arm or the first end portion being lifted away from the rudder pedal arm, and
   a second lever having a third end portion and a fourth end portion, wherein the second lever is pivotally attached to a portion of the rudder pedal arm between the third end portion and the fourth end portion, wherein the third end portion of the second lever rests between the first end portion and the rudder pedal arm when the first lever is in the first configuration, wherein the solenoid is configured to, in response to activation of the solenoid, pull the fourth end portion of the second lever, pivoting the fourth end portion toward the solenoid, and thereby pivoting the third end portion and the first end portion away from the rudder pedal arm, causing the pin to be withdrawn from the pin receiving component.

2. The system of claim 1, wherein the first lever is configured to selectively be pivoted into the second configuration manually by user pressure to the second end portion and automatically by activation of the solenoid.

3. The system of claim 1, wherein the first rudder pedal adjustment system further comprises a remote button or switch configured to activate the solenoid to withdraw the pin from the pin receiving component.

4. The system of claim 1, wherein the first rudder pedal adjustment system further comprises a sensor or microswitch configured to sense when the pin is withdrawn from the pin receiving component and to cause a visual or audible notification to be provided to an operator of the aircraft in response to sensing that the pin is withdrawn from the pin receiving component.

5. The system of claim 1, further comprising a second rudder pedal adjustment system comprising a duplicate set or mirror image set of each of the components of the first rudder pedal system.

6. The system of claim 5, wherein the first rudder pedal adjustment system is configured to control actuation of the rudder of the aircraft in a rightward direction and the second rudder pedal adjustment system is configured to control actuation of the rudder of the aircraft in a leftward direction opposite of the rightward direction.

7. An aircraft rudder control system comprising:
   a first rudder pedal adjustment system including:
      a rudder pedal actuable to control movement of a rudder of an aircraft;
      a support frame component;
      a rudder pedal arm spring-biased and rotatably attached to the support frame component, wherein the rudder pedal is attached to the rudder arm;
      a pin;
      a pin receiving component attached to or integrally formed with the support frame component and having two or more openings or receptacles configured to selectively receive the pin, such that while the pin is received in any of the two or more openings or receptacles, the rudder pedal arm is prevented from rotating;
      a first lever pivotally attached to the rudder pedal arm and having a first end portion fixed to the pin and a second end portion spring-biased away from the rudder pedal arm, wherein the first lever is pivotally attached to the rudder pedal arm between the first end portion and the second end portion;
      a second lever having a third end portion and a fourth end portion and being pivotally attached to a portion of the rudder pedal arm between the third end portion and the fourth end portion, wherein the third end portion of the second lever is located between the first end portion and the rudder pedal arm; and
      a solenoid configured to draw the fourth end portion of the second lever toward the solenoid in response to activation of the solenoid, thus pivoting the second lever to raise the third end portion which lifts the first end portion of the first lever away from the rudder pedal arm, thereby withdrawing the pin from the pin receiving component and freeing the rudder pedal arm to be rotatably repositioned by user foot actuation.

8. The system of claim 7, wherein the first lever is further configured to, regardless of whether or not the solenoid is activated, pull the pin away from the pin receiving component in response to the second end portion being manually pressed toward the rudder pedal arm, thereby pivoting first end portion away from the rudder pedal arm and withdrawing the pin from the pin receiving component.

9. The system of claim 7, wherein the solenoid is configured to, in response to deactivation of the solenoid, release the second lever, allowing the first lever to automatically return or spring back to a naturally biased state in which the pin is pressed into the two or more openings or receptacles of the pin receiving component.

10. The system of claim 7, wherein the first rudder pedal adjustment system further comprises a remote button or switch configured to selectively activate and deactivate the solenoid.

11. The system of claim 7, wherein the first rudder pedal adjustment system further comprises a sensor or microswitch configured to sense when the pin is withdrawn from the pin receiving component and to cause a visual or audible notification to be provided to an operator of the aircraft in response to sensing that the pin is withdrawn from the pin receiving component.

12. The system of claim 7, further comprising a second rudder pedal adjustment system comprising a duplicate set or mirror image set of each of the components of the first rudder pedal system.

13. The system of claim 12, wherein the first rudder pedal adjustment system is configured to control actuation of the rudder of the aircraft in a rightward direction and the second rudder pedal adjustment system is configured to control actuation of the rudder of the aircraft in a leftward direction opposite of the rightward direction.

14. An aircraft rudder control system comprising:
   a first rudder pedal adjustment system and a second rudder pedal adjustment system, wherein each of the first rudder pedal adjustment system and the second rudder pedal adjustment system comprise:
      a rudder pedal actuable to control movement of a rudder of an aircraft;
      a support frame component;
      a rudder pedal arm spring-biased and rotatably attached to the support frame component and integrally comprising a solenoid support structure, wherein the rudder pedal is attached to the rudder pedal arm, wherein a pin hole is formed through the rudder pedal arm;
      a pin actuable into and at least partially through the pin hole of the rudder pedal arm and out of the pin hole of the rudder pedal arm;
      a pin receiving component attached to or integrally formed with the support frame component and having two or more openings or receptacles configured to selectively receive the pin, such that while the pin is received in any of the two or more openings or receptacles, the rudder pedal arm is prevented from rotating;
      a first lever pivotally attached to the rudder pedal arm and having a first end portion fixed to the pin and a second end portion spring-biased away from the rudder pedal arm, wherein the first lever is pivotally attached to the rudder pedal arm between the first end portion and the second end portion;
      a second lever having a third end portion and a fourth end portion and being pivotally attached to the solenoid support structure between the third end portion and the fourth end portion, wherein the third end portion of the second lever is located between the first end portion and the rudder pedal arm without blocking a travel path of the pin through the pin hole;
      a solenoid is attached to the solenoid support structure and is configured to draw the fourth end portion of the second lever toward the solenoid in response to activation of the solenoid, thus pivoting the second lever to raise the third end portion which lifts the first end portion of the first lever, thereby withdrawing the pin from the pin receiving component and freeing the rudder pedal arm to be rotatably repositioned by user foot actuation; and
      a remote button or switch configured to selectively activate and deactivate the solenoid.

15. The system of claim 14, wherein the first lever is further configured to, regardless of whether or not the solenoid is activated, pull the pin away from the pin receiving component in response to the second end portion being manually pressed toward the rudder pedal arm, thereby pivoting the first end portion away from the rudder pedal arm and withdrawing the pin from the pin receiving component.

16. The system of claim 14, wherein the solenoid is configured to, in response to deactivation, allow the fourth end portion of the second lever to pivot away from the solenoid support structure, thereby pivoting the third end portion toward the rudder pedal arm and releasing the first end portion of the first lever to automatically return or spring back to a naturally biased state in which the pin is pressed into one of the two or more openings or receptacles of the pin receiving component.

17. The system of claim 14, wherein one or more components of the second rudder pedal adjustment system are mirror images of one or more components of the first rudder pedal system.

18. The system of claim 14, wherein the first rudder pedal adjustment system is configured to control actuation of the rudder of the aircraft in a rightward direction and the second rudder pedal adjustment system is configured to control actuation of the rudder of the aircraft in a leftward direction opposite of the rightward direction.

\* \* \* \* \*